United States Patent [19]

Akuzawa et al.

[11] Patent Number: 5,331,441
[45] Date of Patent: Jul. 19, 1994

[54] COLOR IMAGE READING APPARATUS HAVING COLOR CORRECTION COEFFICIENTS

[75] Inventors: Yoshihide Akuzawa, Shizuoka; Yukihiko Kambe, Mishima, both of Japan

[73] Assignee: Tokyo Electric Co., Ltd., Tokyo, Japan

[21] Appl. No.: 858,181

[22] Filed: Mar. 26, 1992

[30] Foreign Application Priority Data

Mar. 28, 1991 [JP] Japan ................... 3-089867

[51] Int. Cl.$^5$ ................................ H04N 1/00
[52] U.S. Cl. ...................... 358/530; 358/518
[58] Field of Search .......... 358/316, 332, 333, 500, 358/501, 505, 518, 523, 530, 537; 382/54; 395/131

[56] References Cited

U.S. PATENT DOCUMENTS

| | | | |
|---|---|---|---|
| 4,942,461 | 7/1990 | Abe et al. | 358/75 |
| 4,945,405 | 7/1990 | Hirota | 358/75 |
| 4,989,080 | 1/1991 | Ito | 358/80 |
| 5,068,718 | 11/1991 | Iwabe et al. | 358/27 |
| 5,086,343 | 2/1992 | Cook et al. | 358/213.15 |
| 5,142,356 | 8/1992 | Usami et al. | 358/80 |
| 5,179,437 | 1/1993 | Kawada et al. | 358/10 |
| 5,233,442 | 8/1993 | Kawai et al. | 358/482 |
| 5,237,401 | 8/1993 | Koike et al. | |

FOREIGN PATENT DOCUMENTS 2-44971 2/1990 Japan.

*Primary Examiner*—Bentsu Ro
*Attorney, Agent, or Firm*—Frishauf, Holtz, Goodman & Woodward

[57] ABSTRACT

A color image reading apparatus connected to an image data processing apparatus for the supply of a read-in image to the latter, image data processing apparatus comprises a photoelectric converting element for receiving a color manuscript image and for converting this image into electrical image data, a memory for memorizing color correction coefficients, which are used to enable the image data processing apparatus to perform proper color correction, and which, according to the signal from the image data processing apparatus, supplies the electrical image data and the color correction coefficients to the image data processing apparatus.

2 Claims, 5 Drawing Sheets

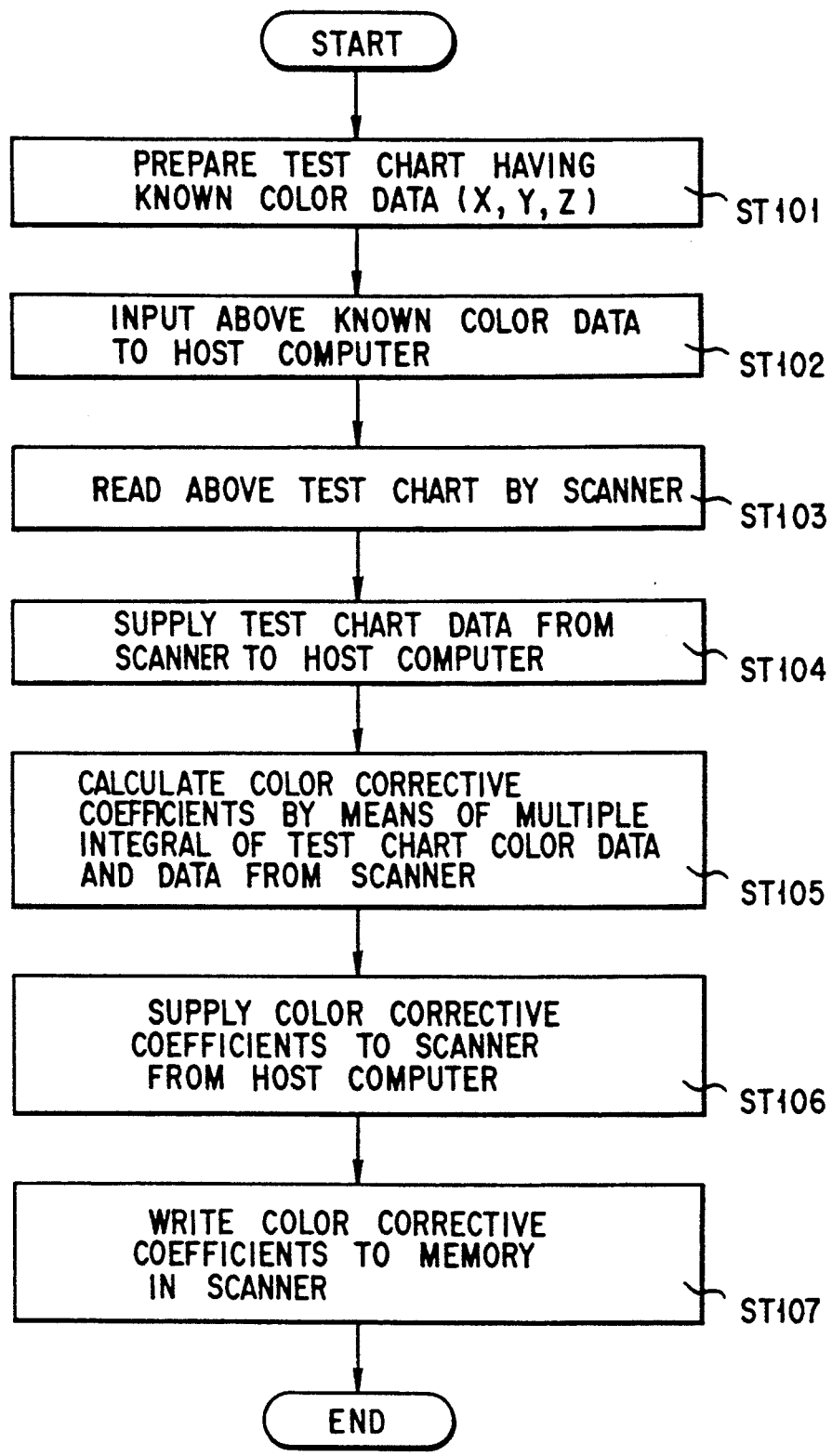
F I G. 5

COLOR IMAGE READING APPARATUS HAVING COLOR CORRECTION COEFFICIENTS

BACKGROUND OF THE INVENTION

1. Field of the Invention

This invention relates to a color image reading apparatus, and more particularly to a color image reading apparatus having color correction coefficients.

2. Description of the Related Art

Color image reading apparatuses are now available in the line sequential reading type and the plane sequential reading type.

In the line sequential reading type, each read-in pixel offers data on R (red), G (green), and B (blue), which undergo color correction by software in the color image reading apparatus and are transmitted to the host computer.

In the plane sequential reading type, an image is read in order of R, G, and B on a page basis, and then the read-in data is sequentially transmitted to the host computer. Then, the data on R, G, and B undergoes color correction by software in the host computer, not in the reading apparatus.

Conventionally, in both the line and the plane sequential reading types, fixed color correction coefficients are set for the color correcting software.

In using of fixed color correction coefficients, if a different color image reading apparatus is connected, properly color correcting could not be carried out in the host computer. This is because each color image reading apparatus has its own color correction coefficients, which is caused by the characteristics of its optical components.

SUMMARY OF THE INVENTION

The object of the present invention is to provide a color image reading apparatus capable of supplying optimum color correction coefficients to the host computer irrespective of its optical characteristics and of its changes with time.

The foregoing object is accomplished by providing a color image reading apparatus connected to an image processing apparatus and sending a read-in color image to the latter, which comprises: photoelectric converting means for receiving a color manuscript image and converting this image into electric image data; means for memorizing color correction coefficients, which are used to enable the image data processing apparatus to perform proper color correction; and means for, according to an instruction signal from the image data processing apparatus, supplying the electric image data and the color correction coefficients to the image data processing apparatus.

Because the color image input apparatus of this invention supplies the color correction coefficients stored in the memorizing means to the image data processing apparatus in response to the output instruction from the latter, the image data processing apparatus can provide optimum color correction irrespective of the type of input apparatus and changes in its characteristics with time.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 5 is a flowchart of the calculation and determination of color correction coefficients in the host computer.

DETAILED DESCRIPTION OF THE PREFERRED EMBODIMENTS

An embodiment of the present invention will be explained, referring to an embodiment of the present invention.

Figure 1:
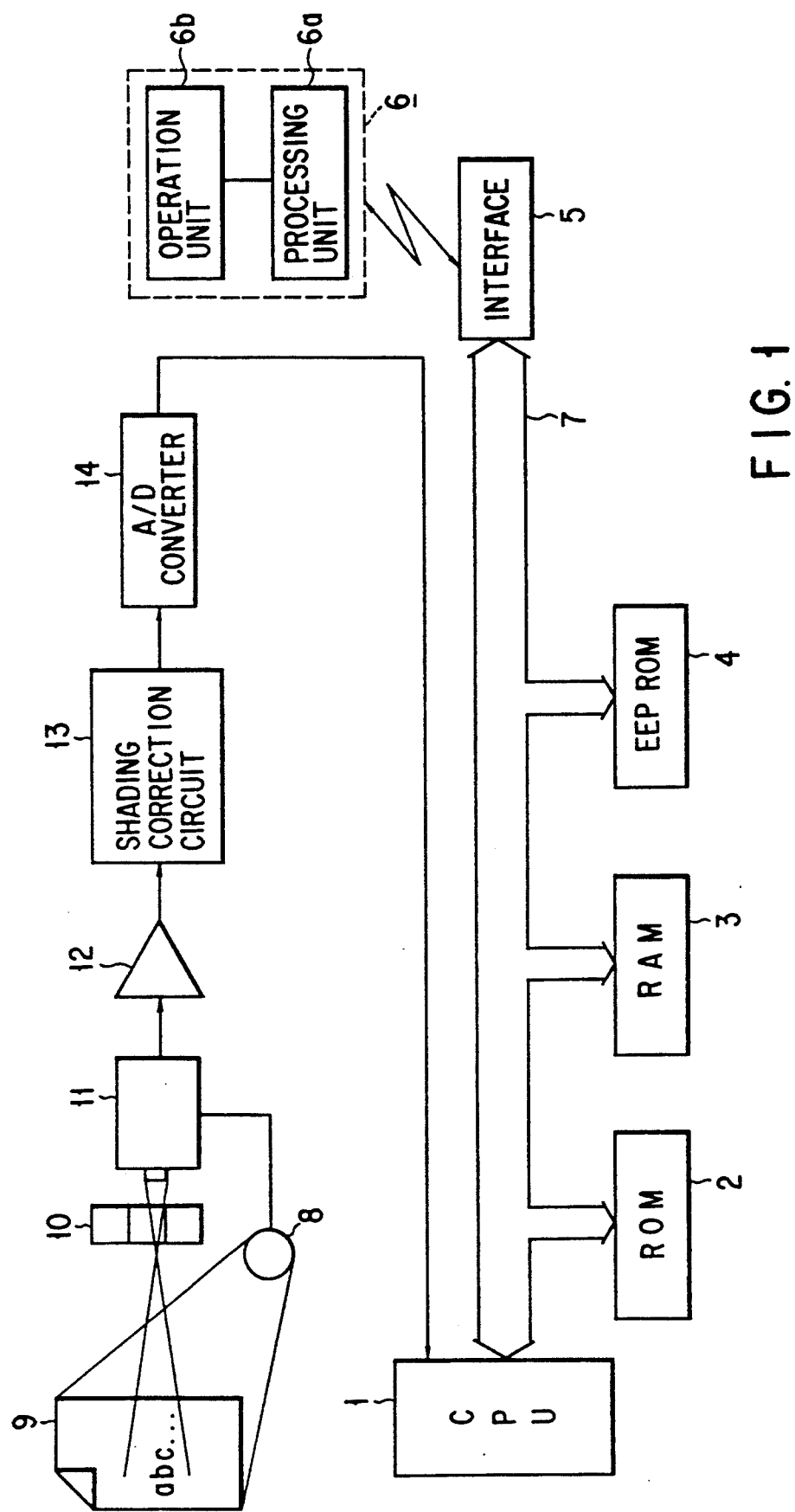
FIG. 1 is a block diagram of an embodiment of the present invention.

In FIG. 1, numeral 1 indicates a CPU (a central processing unit) constituting the main part of the control section. A ROM (a read only memory) 2 stores program data used in the processing by the CPU 1. A RAM (a random access memory) 3 has memory areas in it for use in the processing by the CPU 1.

An EEPROM (electrically erasable and programmable ROM) 4, acting as a color correction coefficient storing means, stores color correction coefficients. Depending on its capacity, the EEPROM 4 is capable of storing a plurality of color correction coefficients entered according to types of manuscript, such as natural pictures or computer graphic mosaic pictures.

An interface 5 is connected to a host computer 6.

The host computer 6 is provided with a color correcting section composed of a processing section 6a, which corrects digital data based on the color correction coefficient, and an operator's panel section 6b used for the entry of color correction coefficients.

The CPU 1 is connected to the ROM 2, the RAM 3, the EEPROM 4, and the interface 5 via a system bus 7.

Rays of light from a light source 8 are reflected by a sheet 9 of manuscript. The reflected light is received by a CCD (a charge-coupled device) sensor 11, a photoelectric converting element, via a color filter 10. The CCD sensor 11 converts the received light signal into an electric signal. This electric signal from the CCD sensor 11 is amplified at an amplifier 12, is corrected at a shading correction circuit 13, and is supplied to an A/D (analog/digital) converter 14.

The A/D converter 14 converts the electric signal into digital data, which is taken out by the CPU 1.

Figure 2:
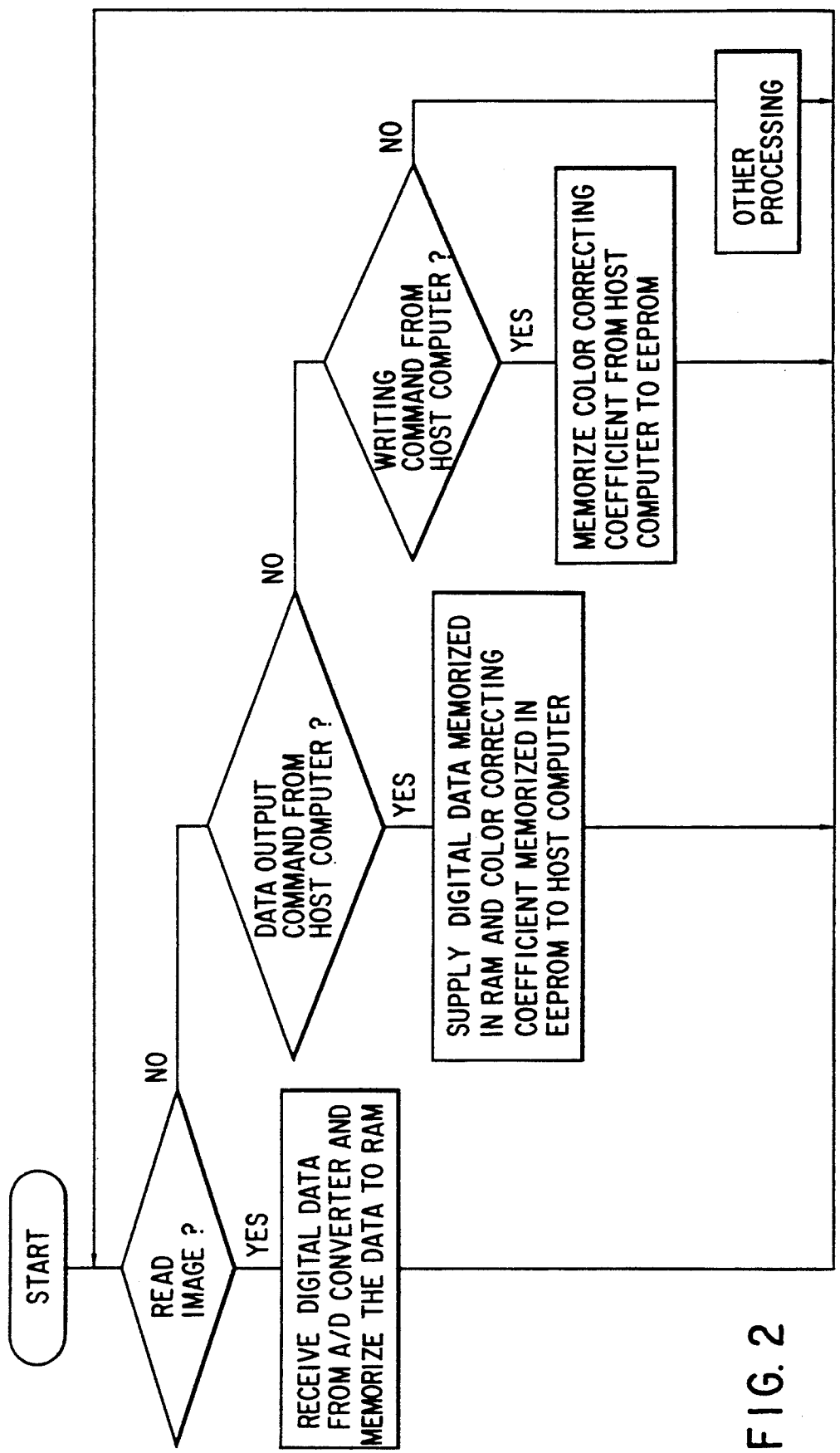
FIG. 2 is a flowchart of the processing of the FIG. 1 embodiment.

FIG. 2 shows a flowchart of primary processes the CPU 1 performs.

First, it is judged whether or not an image has been read based on the output signal from the A/D converter 14. If the reading has been done, digital data is taken from the A/D converter 14 and then stored in the RAM 3. After this, control is returned to the start of the processing.

If the reading has not been done, it is judged whether or not the data output instruction from the host computer has been received via the interface 5.

If the digital data output instruction from the host computer 6 has been received, the digital data stored in the RAM 3 and the color correction coefficient data stored in the EEPROM 4 are sent to the host computer 6 via the interface 5. When the EEPROM 4 stores, for example, color correction coefficients according to types of manuscript, the color correction coefficient data for the type of manuscript specified by the digital data is selected. This color correction coefficient data, together with the digital data, is sent to the host computer 6 (a transmitting function).

Then, control is returned to the start of the processing.

If the digital data output instruction has not been received from the host computer 6, it is judged whether or not the write instruction from the host computer 6 has been received via the interface.

If the write instruction has been received from the host computer 6, the color correction coefficient data in the EEPROM 4 is erased, and the color correction coefficient data received immediately after the write instruction from the host computer 6 is written into the EEPROM 4 (a correcting function).

In the case of more than one color correction coefficient stored in the EEPROM 4, the color correction coefficient of the same type as that of the color correction coefficient just received is erased from the EEPROM 4, and the color correction coefficient just received is written into the EEPROM 4.

If the write instruction from the host computer 6 has not been received, another process is performed and then control is passed to the start of the processing. With this arrangement, the digital data taken by the CPU 1 from the A/D converter 14 is stored in the RAM 3.

Receiving a digital data output instruction from the host computer 6 via the interface 5, the CPU 1 transmits digital data and color correction coefficient data to the host computer 6 via the interface 5.

The processing unit 6a of the host computer 6 receives the digital data and color correction coefficient data, and color-corrects the digital data based on the color correction coefficient data.

The color correction coefficient entered from the operator's panel section 6b of the host computer 6 is transmitted to the interface 5, following the write instruction.

When the CPU 1 receives the write instruction from the host computer 6 via the interface 5, it erases the color correction coefficient data from the EEPROM 4 and then stores in the EEPROM 4 the color correction coefficient data received immediately after the write instruction from the host computer 6.

In the case of more than one color correction coefficient data stored in the EEPROM 4, when the CPU 1 receives a digital data output instruction from the host computer 6, it transmits to the host computer 6 the digital data and the color correction coefficient data for the type of image specified by the digital data.

The host computer 6 color-corrects the digital data based on the color correction coefficient data.

Then, after receiving the write instruction from the host computer 6, the CPU 1 erases from the EEPROM 4 the color correction coefficient data of the same type as that of the color correction coefficient received immediately after the write instruction and then stores the just received color correction coefficient data in the EEPROM 4.

The following matrix data is given as a concrete example of color correction coefficients:

$$\begin{pmatrix} K0, & K1, & K2 \\ K3, & K4, & K5 \\ K6, & K7, & K8 \end{pmatrix} = \begin{pmatrix} 1.76736, 0.124998, & -0.82193 \\ 0.681050, 0.822013, & -0.869916 \\ 0.890278, & -0.642603, 0.479392 \end{pmatrix} \quad (1)$$

By multiplying the r, g, b image signals by these color correction coefficients, optimum color correction can be performed.

Figure 3:
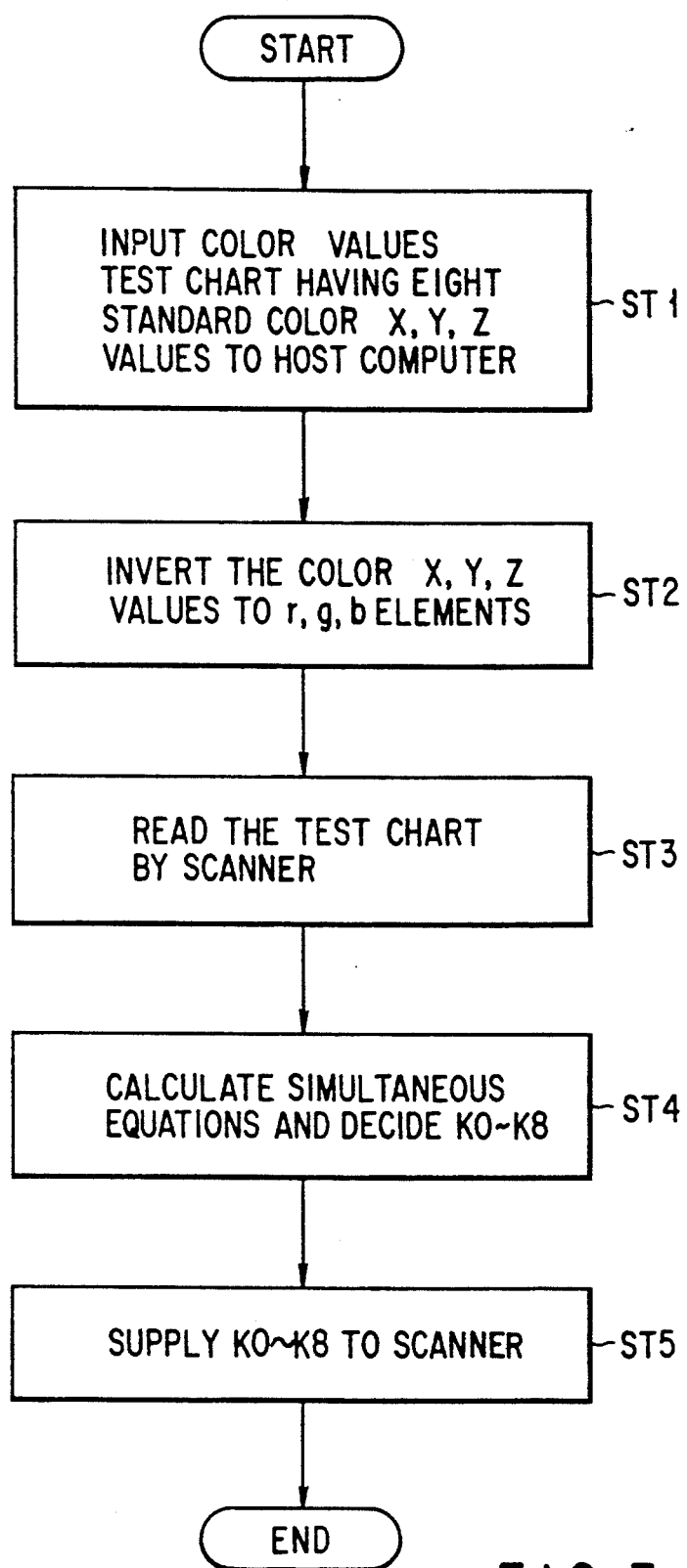
FIG. 3 is a flowchart of the calculation of color correction coefficients.

FIG. 3 is a flowchart showing how to calculate color correction coefficients. Specifically, color correction coefficients are computed in the following procedures. First, a test chart is prepared which lists X, Y, and Z values for each of eight standard colors (ST1). Then, color values, X, Y, and Z are converted into r, g, and b components (ST2). The r, g, and b components of each standard color thus obtains are as follows:

| | | | | (2) |
|---|---|---|---|---|
| C (cyan) | : Csr, | Csg, | Csb | |
| Y (yellow) | : Ysr, | Ysg, | Ysb | |
| M (magenta) | : Msr, | Msg, | Msb | |
| R (red) | : Rsr, | Rsg, | Rsb | |
| G (green) | : Gsr, | Gsg, | Gsb | |
| B (blue) | : Bsr, | Bsg, | Bsb | |
| Bk (black) | : Ksr, | Ksg, | Ksb | |
| W (white) | : Wsr, | Wsg, | Wsb | |

X, Y, and Z are converted into r, g, and b, using the following matrix:

$$\begin{pmatrix} r \\ g \\ b \end{pmatrix} = \begin{pmatrix} 0.4185, & -0.1587, & -0.0828 \\ -0.0911, & 0.2524, & 0.0157 \\ 0.0009, & -0.0025, & 0.1786 \end{pmatrix} * \begin{pmatrix} X \\ Y \\ Z \end{pmatrix} \quad (3)$$

Next, color correction coefficients K0, K1, and K2 are calculated. The test chart is read with a scanner. The r, g, and b components of each piece of data (eight colors) entered in the host computer are as follows:

| | | | | (4) |
|---|---|---|---|---|
| C (cyan) | : Cr, | Cg, | Cb | |
| Y (yellow) | : Yr, | Yg, | Yb | |
| M (magenta) | : Mr, | Mg, | Mb | |
| R (red) | : Rr, | Rg, | Rb | |
| G (green) | : Gr, | Gg, | Gb | |
| B (blue) | : Br, | Bg, | Bb | |
| Bk (black) | : Kr, | Kg, | Kb | |
| W (white) | : Wr, | Wg, | Wb | | because the color correction coefficients K0, K1, and K2 are used to determine the r component after correction, the following equations hold theoretically:

$$Csr = K0 * Cr + K1 * Cg + K2 * Cb \quad (5)$$
$$Ysr = K0 * Yr + K1 * Yg + K2 * Yb$$
$$Msr = K0 * Mr + K1 * Mg + K2 * Mb$$
$$\vdots$$
$$Wsr = K0 * Wr + K1 * Wg + K2 * Wb$$

Since K0, K1, and K2 are unlikely to meet these equations perfectly, K0, K1, and K2 that minimize the sum of the square of errors in each equation are used as correction coefficients.

For example, the square of errors in color C is expressed by a multiple analytical method as follows:

$$[Csr-K0*Cr+K1*Cg+K2*Cb]^2 \quad (6)$$

Thus, the total sum of the square of errors in each equation is expressed as:

$$S = \Sigma[Sri - (K0*ri + K1*gi + K2*bi)]^2 \quad (7)$$

where $$\begin{aligned} sri &: Csr, Ysr, Msr, \ldots Wsr \\ ri &: Cr, Yr, Mr, \ldots Wr \\ gi &: Cg, Yg, Mg, \ldots Wg \\ bi &: Cb, Yb, Mb, \ldots Wb \\ i &: 0\text{-}7 \text{ (8 color)} \\ \Sigma &: \sum_{i=0}^{7} \end{aligned} \quad (8)$$

In this equation, the error total sum S has only one relative minimum value, which is virtually the absolute minimum value. Here, K0, K1, and K2 that meet the following equation will be obtained:

$$\frac{\partial S}{\partial K0} = \frac{\partial S}{\partial K1} = \frac{\partial S}{\partial K2} = 0 \quad (9)$$

where $$\frac{\partial S}{\partial K0} = -2\Sigma[sri - (K0*ri + K1*gi + K2*bi)]*ri \quad (10)$$

$$\frac{\partial S}{\partial K1} = -2\Sigma[sri - (K0*ri + K1*gi + K2*bi)]*gi$$

$$\frac{\partial S}{\partial K2} = -2\Sigma[sri - (K0*ri + K1*gi + K2*bi)]*bi$$

Thus, the following simultaneous equations hold:

$$\Sigma(sri\, ri) = [\Sigma ri^2]*K0 + [\Sigma ri\, gi]*K1 + [\Sigma ri\, bi]*K2 \quad (11)$$
$$\Sigma(sri\, gi) = [\Sigma ri\, gi]*K0 + [\Sigma gi^2]*K1 + [\Sigma gi\, bi]*K2$$
$$\Sigma(sri\, bi) = [\Sigma ri\, bi]*K0 + [\Sigma gi\, bi]*K1 + [\Sigma bi^2]*K2$$

Solving these equations will give K0, K1, and K2. Similarly, K3, K4, K5, K6, K7, and K8 can be calculated (ST4). Coefficients K0 to K8 thus computed are transferred to the scanner (ST5).

Figure 4:
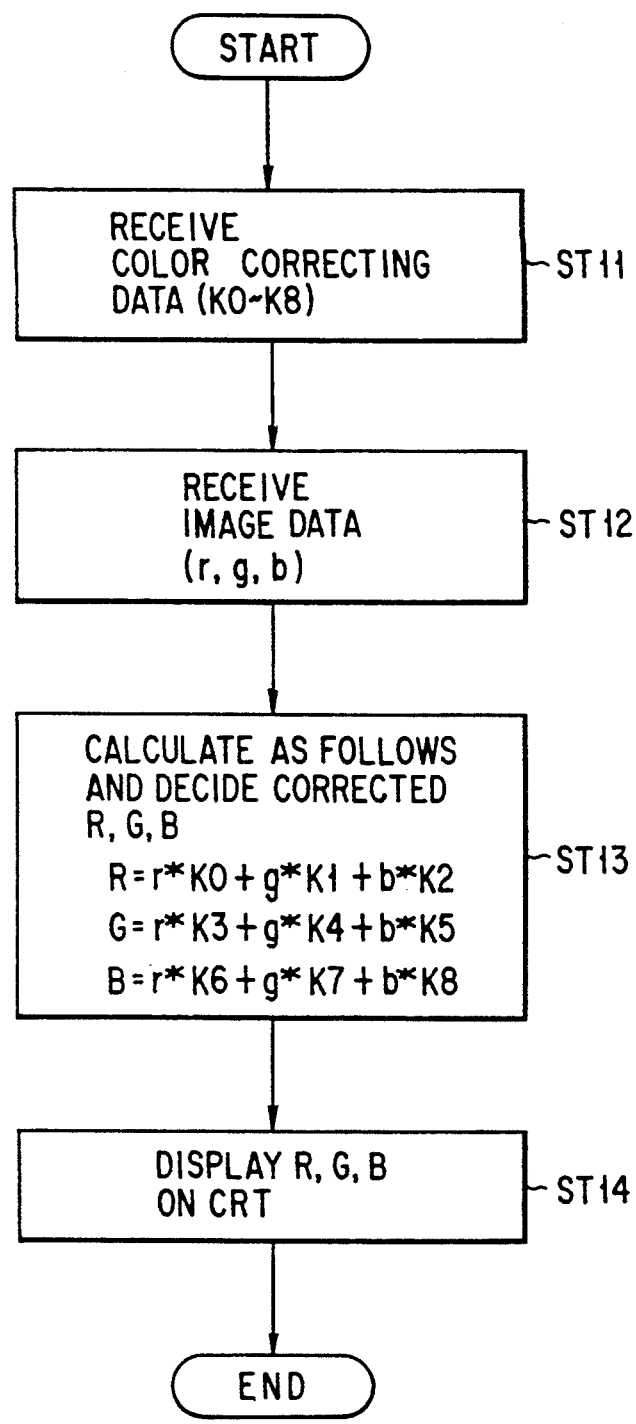
FIG. 4 is a flowchart of the processing after the host computer has received color correction coefficients.

FIG. 4 is a flowchart of the processing carried out after the host computer has received the color correction coefficients.

First, the host computer receives the proper color correction coefficients (ST11) from the color image reading apparatus. Then, it receives image data (r, g, b) itself (ST12). Next, it performs matrix calculation of the image data and the color correction coefficients to produce color-corrected image signals (ST13). Finally, it causes color-corrected image to be displayed on the CRT (ST14). Following these procedures, the host computer can synthesizes properly color-corrected image signals for display.

FIG. 5 is a flowchart showing how color correction coefficients are computed and determined in the host computer.

This invention may be practiced or embodied in various ways without departing from the spirit or essential character thereof. For instance, a basic embodiment may be considered which has a set of color correction coefficients in the scanner, corresponding to the scanner's characteristics. In response to the instruction signal from the host computer 6, these color correction coefficients are transferred to the host computer 6 via the interface 5. In the case of more than one color coefficient stored in the scanner, the host computer 6 supplies a signal to select the best suited coefficient from the set of coefficients, and then the selected coefficient is sent to the host computer 6 for proper color correction of r, g, and b signals.

For a scanner with an EERPOM 4, coefficients are supplied to the scanner from the host computer 6 via the interface 5 so as to erase the coefficients from the EEPROM 4 and write the new coefficients in it.

As shown in the FIG. 5 flowchart, coefficients are calculated and determined within the host computer 6. In this approach, a standard test pattern (chart) with clear contents of data is read with a scanner, and based on the data thus obtained, color correction coefficients are computed and determined according to the scanner deflection.

Specifically, a test chart with known contents are prepared (ST101). Then, the data in the test chart is supplied to the computer (ST102) for subsequent comparison with the data from the scanner. Next, the test chart is read directly with the scanner (ST103). The test chart data thus read is supplied to the host computer 6 (ST104). Here, the scanner may supply somewhat deflected color data because of changes in its properties with time or its inherent characteristics. This invention enables the determination of color correction coefficients that correct such a deflection. In the host computer, numerical input (ST101) is compared with the data from the scanner. The comparison results undergo multiple integral to determine the color correction coefficients peculiar to the scanner (ST105). The color correction coefficients thus determined are sent back to the scanner via the interface 5 (ST106), and are stored in memory such as the EEPROM 4 in the scanner (ST107). Following these procedures, the host computer receives the color correction coefficients that properly correct the color defection peculiar to the scanner, and produces deflection-free image signals.

In the present embodiment, those actions are carried out half automatically by application software stored in the host computer with slight human intervention. That is, once the operator has called the color correcting mode to allow the scanner to read the test chart, this system then automatically performs optimum color correction.

With the present embodiment, in response to a digital data output instruction from the host computer, digital data, together with color correction coefficient data from the EEPROM, is transmitted to the host computer, which can perform proper color correction based on these two types of data.

Because the host computer transmits color correction coefficient data immediately after the write instruction, the color correction coefficient data, stored in the EEPROM of the color image reading apparatus, can be corrected. This makes it possible for the apparatus to cope well with changes in its characteristics with time.

Because of its capability to store a plurality of color correction coefficients, the host computer can provide proper color correction according to, for example, the type of an image to be read (such as natural pictures or computer graphic mosaic pictures).

As described above, the present invention provides a color image reading apparatus that allows the setting of best suited color correction coefficients for itself, thereby causing the color correction processing section to perform the proper color correction.

Because the color correction coefficients can be corrected later, the color image reading apparatus of the present invention can cope well with changes in its characteristics with time.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A color image data processing system comprising:
    an image data processing apparatus for externally receiving a color image data and for processing the received color image data in a predetermined sequence;
    a color image reading apparatus, coupled to said image data processing apparatus and for supplying the read-in color image to the image data processing apparatus, the color image reading apparatus including:
        photoelectric converting means for receiving a color manuscript image and for converting the received color manuscript image into electrical image data; and
        memory means for memorizing a plurality of color correction coefficients, which are used to enable said image data processing apparatus to perform proper color correction, and for selecting one of the plurality of color correction coefficients according to the signal from said image data processing apparatus;
    receiving means for receiving an image signal of a reference image;
    comparing means for comparing the received image signal of a reference image with an ideal value data of the reference image to determine a color deflection degree of said color image reading apparatus; and
    means for calculating a new color correction coefficient according to the color deflection degree by using a multiple integral and for supplying the calculation results to said memory means of said color image reading apparatus, which memorizes the new color correction coefficient.

2. A color image data processing system according to claim 1, wherein said receiving means, said comparing means, and said new color correction coefficient calculating means, are all provided in the form of software for said image data processing apparatus.

* * * * *